(12) United States Patent
Wilson, III et al.

(10) Patent No.: US 6,460,031 B1
(45) Date of Patent: Oct. 1, 2002

(54) SYSTEM AND METHOD FOR CREATING AND TITLING REPORTS USING AN INTEGRATED TITLE BAR AND NAVIGATOR

(75) Inventors: John M. Wilson, III, Mountain View, CA (US); Michael Good, Los Altos, CA (US); Peter Ebert, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 09/340,304

(22) Filed: Jun. 28, 1999

(51) Int. Cl.[7] .......................... G06F 17/30; G06F 17/27
(52) U.S. Cl. ............................... 707/3; 707/104; 704/9
(58) Field of Search ...................... 707/1–6, 100–104; 704/9–10

(56) References Cited

U.S. PATENT DOCUMENTS

| | | | | |
|---|---|---|---|---|
| 5,369,763 A | * | 11/1994 | Biles ........................... | 395/600 |
| 5,404,512 A | * | 4/1995 | Powers et al. ............... | 395/600 |
| 5,555,403 A | * | 9/1996 | Cambot et al. ............. | 395/600 |
| 5,603,025 A | * | 2/1997 | Tabb et al. .................. | 395/602 |
| 5,659,724 A | * | 8/1997 | Borgida et al. ............. | 395/603 |
| 5,701,453 A | * | 12/1997 | Maloney et al. ............ | 395/602 |
| 5,778,357 A | * | 7/1998 | Kolton et al. ............... | 707/2 |
| 5,909,678 A | * | 6/1999 | Bergman et al. ............ | 707/4 |
| 5,956,708 A | * | 9/1999 | Dyko et al. .................. | 707/3 |
| 6,006,221 A | * | 12/1999 | Liddy et al. ................. | 707/5 |
| 6,006,224 A | * | 12/1999 | McComb et al. ............ | 707/5 |
| 6,076,088 A | * | 6/2000 | Paik et al. ................... | 707/5 |
| 6,205,447 B1 | * | 3/2001 | Malloy ....................... | 707/102 |

* cited by examiner

Primary Examiner—James P. Trammell
Assistant Examiner—Mary Wang
(74) Attorney, Agent, or Firm—Finnegan, Henderson, Farabow, Garrett and Dunner, L.L.P.

(57) ABSTRACT

A system for creating and titling reports from a database by using a graphical title bar navigator to create and depict a natural language phrase to query a database and title the resulting report such that the navigator itself becomes the title, is provided. A set of parameters embodying the various tables and fields in a traditional database system is provided for selection in a menu by the user through this navigator. The user selects a first parameter through the navigator. Based on this selection, a further set of parameters is made available. Another selection is made and so on, until the specificity of the query has been achieved. Each selection that is made grammatically follows the selection before it such that the navigator depicts a complete sentence in natural language form. The query is communicated from the interface to the database management system which, in turn, accesses the data. The natural language phrase persists and becomes the title of the report.

24 Claims, 9 Drawing Sheets

SYSTEM AND METHOD FOR CREATING AND TITLING REPORTS USING AN INTEGRATED TITLE BAR AND NAVIGATOR

FIELD OF THE INVENTION

This invention relates to a system for the use of natural language to access and present data. More particularly, this invention discloses a system that allows a user to navigate through a menu to select parameters in order to generate and title a report.

BACKGROUND OF THE INVENTION

In the prior art, the process of generating reports from a database has involved a very mechanical means of accessing data and setting a standardized title for standardized reports. A report is an aggregation of data from a database that presents specific information in response to a certain query. When reports are generated, they are generally given preset titles which have been hard-coded to be associated with a particular report. Users have been limited from employing natural language phrases to create a title for the report. There has been a need in the field of the present invention to make the accessing and presentation of data more user-friendly. The prior art lacks an effective means of using natural language phrasing to enable storytelling through the presentation of data.

Also, generally when application programs which provide front-end interfaces are used, a menu-based system at the top of the display area which takes up a certain amount of space is provided. These menus are provided to allow the user to make selections to activate certain operations, the result of which is shown in the remainder of the screen. As the amount of display area which is available is limited, this can be an inefficient use of space. There is a need for a menu-based system which can serve a dual function, thereby increasing the amount of available display area.

Furthermore, in the past, the process of creating a natural language system for a database involved writing a natural language grammar and a corresponding lexicon. This type of system interprets natural language expressions typed in by the user and parses these expressions into database queries. The creation of this type of system normally requires years of time-consuming work by a linguist and/or lexicographer.

Natural language systems generally fall into two categories: those based on pseudo-English, where a user must learn a command language that is English-like, such as COBOL, and those based on the theory that a user should be allowed to express himself as naturally as he does in everyday life and that the system should be able to make sense of his input. In the latter system, an input string comprises a question in natural language, and the system interprets this question and formulates a query. In order to accomplish this, interfaces to database systems have employed a type of grammar logic which is used to characterize the sets of acceptable input strings. A parsing system accesses this logic to parse the input string into functional parts that comply with the grammar logic. Neither of the two categories of natural language systems are in widespread use today as they are neither easy to use nor are they easy to construct and operate.

There are several problems which accompany pure natural language interfaces. When users inputted their statements with less than accurate grammatical structure, systems generally were not able to process these statements. Users needed to know the limitations and boundaries of the grammar logic which had been implemented in that particular system. Accordingly, there is a need for a more effective way for a user to formulate a natural language phrase recognizable by a computer system without any specialized knowledge.

Databases have become crucial to the operations of day-to-day business and processes, not only because of the increased volume of data, but because of the relationships between the data which can be exploited. For example, Structured Query Language (SQL) has become the preferred means of communicating queries to relational databases. There are presently various methods of querying a database; however, the concept of graphically depicting a query on a display screen is a relatively new approach to the database interfacing art. Visual queries, or graphical queries, make use of graphics on a graphical user interface (GUI) to represent the query, which in the past, was previously defined as an SQL statement. This type of query system presents a pictorial depiction of the search and eliminates the need for a user to learn any sort of query language, SQL in particular.

Another means of communicating queries to relational databases is the multidimensional (MDX) statement. In the MDX model, a MDX query can be reduced to a number of unique SQL statements, however, it has the additional feature of iterative refinement. In the MDX model, a query can be modified by taking the data from the original query and modifying it, eliminating the need to regenerate the entire modified query and retrieve the entire data set a second time. Two common MDX models in the prior art are those supported by Microsoft's OLD DB for an Online Analytical Processing interface and those supported by the MDAPI interface from the OLAP Council.

A reduction in the amount of time invested in the training of a system user is an area where further efficiency can be achieved. Fortunately, there are already tools, such as an already established base of queries formulated by classical SQL expressions, to help attain this efficiency. However, the end users of databases are often not very proficient in the tools available to efficiently and accurately access database systems. Thus, a need exists for systems which convert query statements into visual representations understandable by novice database users.

SUMMARY OF THE INVENTION

The present invention provides a system for creating and titling reports from a database by using a graphical title bar navigator to create and depict a natural language phrase from a menu to query a database and title the resulting report such that the navigator itself becomes the title. A database contains certain sets of data with certain relationships between these sets. These sets of data are manually mapped to the navigator such that it duplicates the hierarchical structure present in the database.

The present invention focuses on generating a query interface to a database through this navigator wherein each choice of data available for retrieval is an option in the menu. Instead of allowing a user to type in a natural language sentence, it constrains the user's input options through this navigator. Each subsequent selection in the menu is a narrower subset of the prior selection, resulting in the creation of a drill down query. The user specifies only the tables, fields, and operations that are required. Because the options for creating the query are limited by the categories of data that are available in the menu, it is possible to constrain the menu such that complete, grammatically correct sentences are created.

The user chooses a first parameter from the menu through the navigator by selecting the graphical icon representing that parameter from the menu. This icon is animated to a larger size and highlighted. Based on this selection, a further set of parameters is made available. Another selection is made by choosing the appropriate graphical icons and so on, until the specificity of the query has been achieved. Further graphical icons representing grammatical connectors are placed between these selections to provide the flow of a natural language phrase. Therefore, each selection that is made grammatically follows the selection before it, such that, upon completion, the navigator depicts a complete sentence in natural language form. The system constrains the choices in order to ensure the creation of a grammatically correct natural language phrase. The query corresponds to an SQL statement, which is communicated from the interface to the database management system which, in turn, accesses the relevant data and returns it to the interface. The same natural language phrase which was used to query the database persists on the display and serves as the title of the report.

Therefore, it is an object of the present invention to provide a visual means of formulating natural language queries to a database system.

It is a further object of the present invention to provide a navigation system to navigate through a menu of parameters.

It is a further object of the present invention to provide animation and highlighting functionality to the navigation system to facilitate user interaction.

It is a further object of the present invention to provide a navigation system which depicts a natural language phrase corresponding to a query for and the title of, a report from a database.

It is a further object of the present invention to provide a pictorial representation of a query formulated by a user to a database system.

It is a further object of the present invention to translate a database table structure into a graphical menu in a navigation system which interfaces to a database system.

DETAILED DESCRIPTION OF THE INVENTION

The following description will focus on a preferred embodiment of the invention that is operative in a single computer system with an attached data storage mechanism. The present invention, however, is not limited to any particular application or environment. Instead, those skilled in the art will find that the present invention may be advantageously applied to any application or environment in which a query to a database storage mechanism is desirable. The description of the exemplary embodiment which follows is for the purpose of illustration and not limitation.

Figure 1:
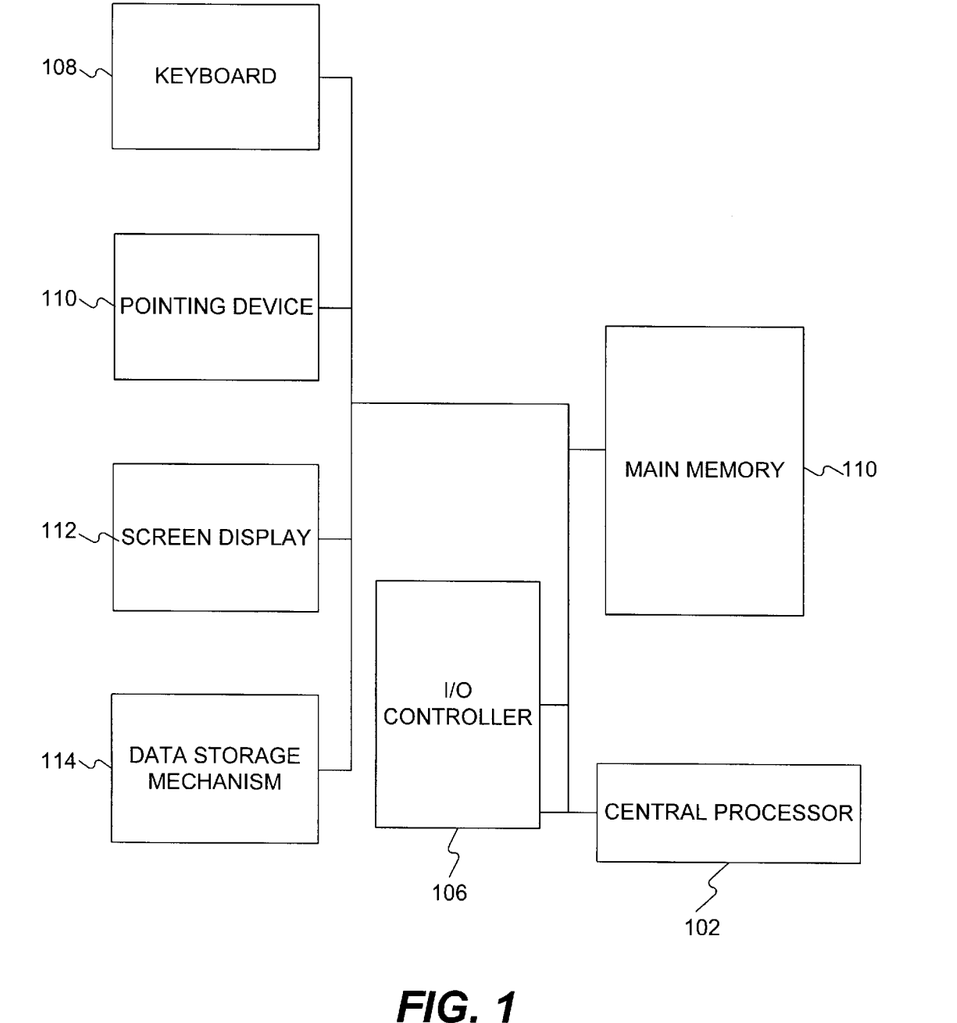
FIG. 1 depicts a computer system in which the present invention can be implemented.

The invention may be embodied on a computer system such as the system of FIG. 1, which comprises central processor 102, main memory 104, input/output controller 106, keyboard 108, pointing device 110, screen display 112, and structured data source 114. The structured datasource may be any one of a number of database systems such as Microsoft Access, dbase, Oracle, Sybase, etc. The structured datasource may be a spreadsheet, a relational database, or a multidimensional database. In a preferred embodiment, the SAP Business Warehouse is used.

Figure 2:
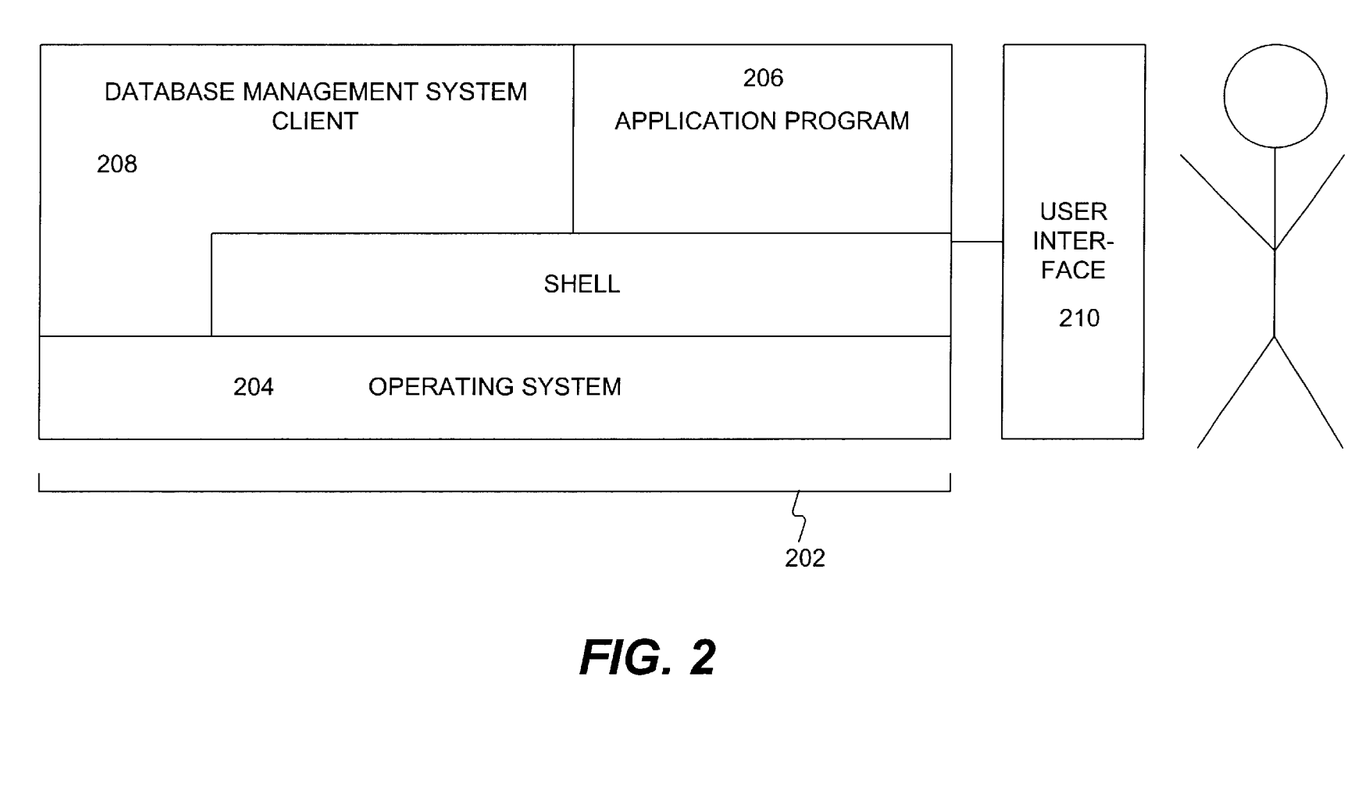
FIG. 2 is a block diagram illustrating a software subsystem for controlling the operation of the computer system of FIG. 1.

Illustrated in FIG. 2, a computer software system is provided for directing the operation of the computer system. The software system, which is stored in system memory 202, and on mass storage or disk memory, includes a kernel or operating system 204, which in this specific embodiment is Windows 95. One or more application programs 206, such as the application software for the present invention, may be loaded (transferred from disk into main memory) for execution by the system. There is a database management system client 208 running in system memory 202. The system also includes user interface 210 for receiving user commands and data as input and displaying result data as output.

The present invention utilizes a monitor or other means of visual display for a computer system which permits the user to view the results from the query. The display of information on the visual displays can be changed by the user by selecting the appropriate icons in the user interface. While the user may select the view style by keyboard input, in the preferred embodiment of this invention, a mouse pointer device is used. The control and display of a mouse-controlled pointer device is well known, and one skilled in the art can readily generate such graphic displays. Other forms of input to the system may be used such as speech recognition technologies. In the practice of the present invention, the user may modify the pictorial representation of the query displayed by clicking-and-dragging the mouse pointer device over the appropriate menu icon generated and displayed in the user interface. When the user selects the desired button, the query is changed to reflect the user's new preferences.

Figure 3:
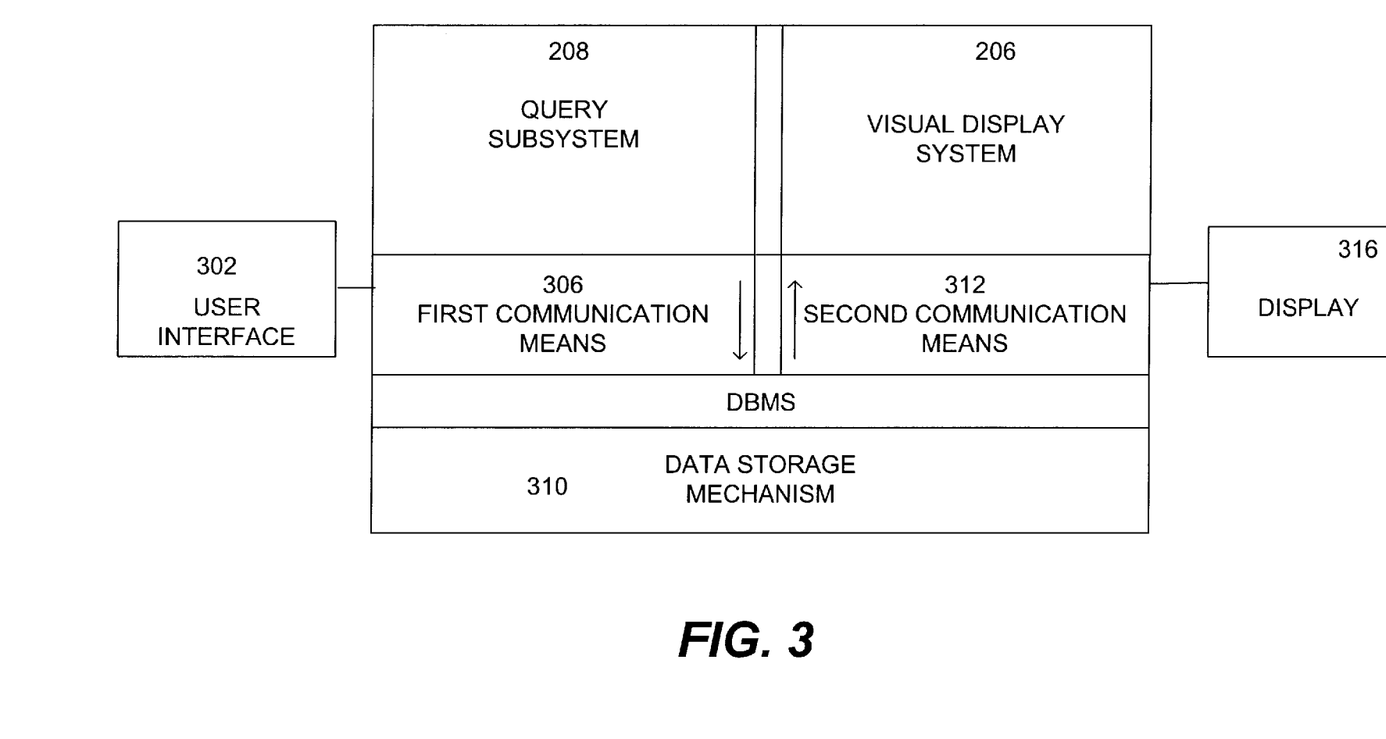
FIG. 3 depicts a block diagram of the present invention.

The system of the present invention is further depicted in FIG. 3. It comprises user interface 302, subsystem for formulating data queries 304, first communication means 306 for transmitting the data queries to database management system 308, database storage mechanism 310, and second communication means 312 for transmitting data from the database storage mechanism to visual display system 314 and display 316.

In the preferred embodiment, the query language used is a multidimensional (MDX) query language supported by Microsoft's OLE DB for Online Analytical Processing interfacing. Again, there are a number of languages that may be utilized in the practice of the present invention. The present invention may also function in a Structured Query Language environment, which although less efficient, is operative nonetheless. In the MDX model, queries can be reduced to SQL statements, however, it is more efficient for the purposes of the present invention. The preferred embodiment operates in a multidimensional environment which allows for iterative refinement. When queries are modified, the existing retrieved data set from the original query is modified rather than repeating the entire process. These languages define in computer-recognizable terms the tables from which the data is to be extracted, the columns of interest, the conditions that rows must satisfy, what columns are to be included, how the select columns are to be grouped, the order of the column, distinctiveness constraints in the column, connections of data within tables, and lower level or subqueries to be integrated into the base queries. As noted before, there can be a number of nonstandard MDX statements within the relational database community.

Objects can be manipulated by one of two basic actions of select and deselect. The results of these actions are similar but uniquely individual for each object type. The object itself defines what part of the MDX statement it in fact must create.

In a simplified version of the invention, grammatical connectors are hard-coded into the interface, and the only parameters to be chosen are the nouns, or data objects themselves. In a more advanced embodiment, it is possible to define the connectors themselves in order to define the relationships between data sets. Said connectors can include such mathematical operators as greater than, less than, equal to, etc.

Figure 4:
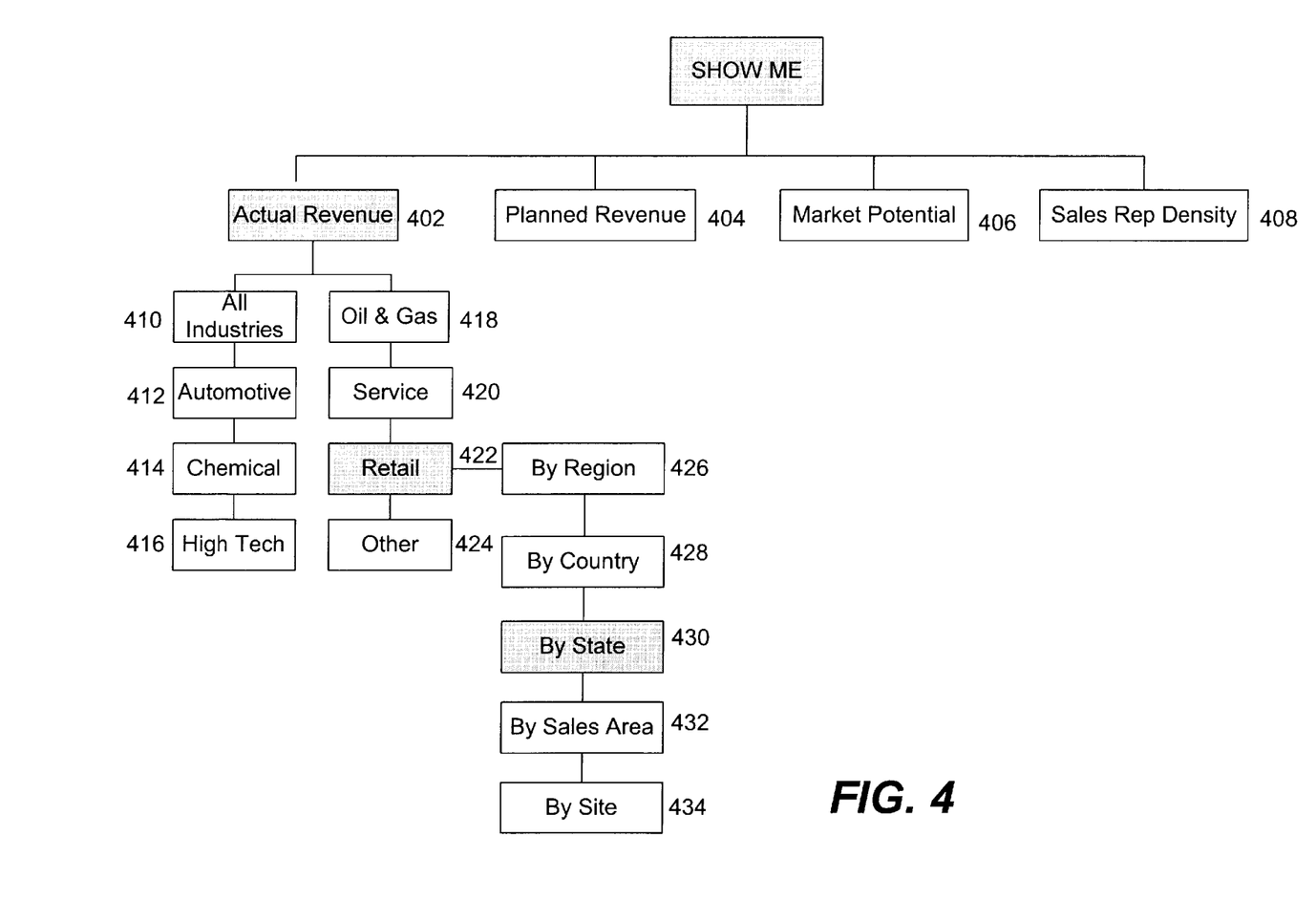
FIG. 4 depicts the hierarchy of parameters available in the current example.

The title bar navigator is preloaded with the components of the natural language statement, including key graphical icons and drilldowns. Each object contains multiple objects which belong to that object. These objects are represented by graphical icons. The table, column, row, and field values are mapped to each of these objects depending on the interface. The first object in this embodiment of the title bar navigator is the ShowMe object. After this basic object, there will be further objects. For example, a particular database contains a variety of information about sales and revenue for a variety of products. In this database, there are a number of measurable variables which quantify the information available. FIG. 4 depicts the hierarchy of parameters available in the current example. In this scenario, these are Actual Revenue 402, Planned Revenue 404, Market. Potential 406, and Sales Rep Density 408. Each of these variables are mapped to their own objects in the query interface. Each of these first level objects, or measures in OLAP terminology, have a number of second level objects, or dimensions in OLAP terminology, associated with them. Upon selection of the initial object, the measure, the parameters through which the selection can be narrowed are then made available through additional second level objects, the dimensions. For instance, in the current example, one can inquire about Actual Revenue for All Industries 410, Automotive 412, Chemical 414, High Tech 416, Oil & Gas 418, Service 420, Retail 422, and Other 424. After selecting Retail 422, the parameters through which this selection can be narrowed are again made available through the additional second level objects. These are ByRegion 426, ByCountry 428, ByState 430, BySalesArea 432, and BySite 434. After completion of the selections, the MDX statement generation is simultaneously completed and communicated to the database management system.

Figure 5:
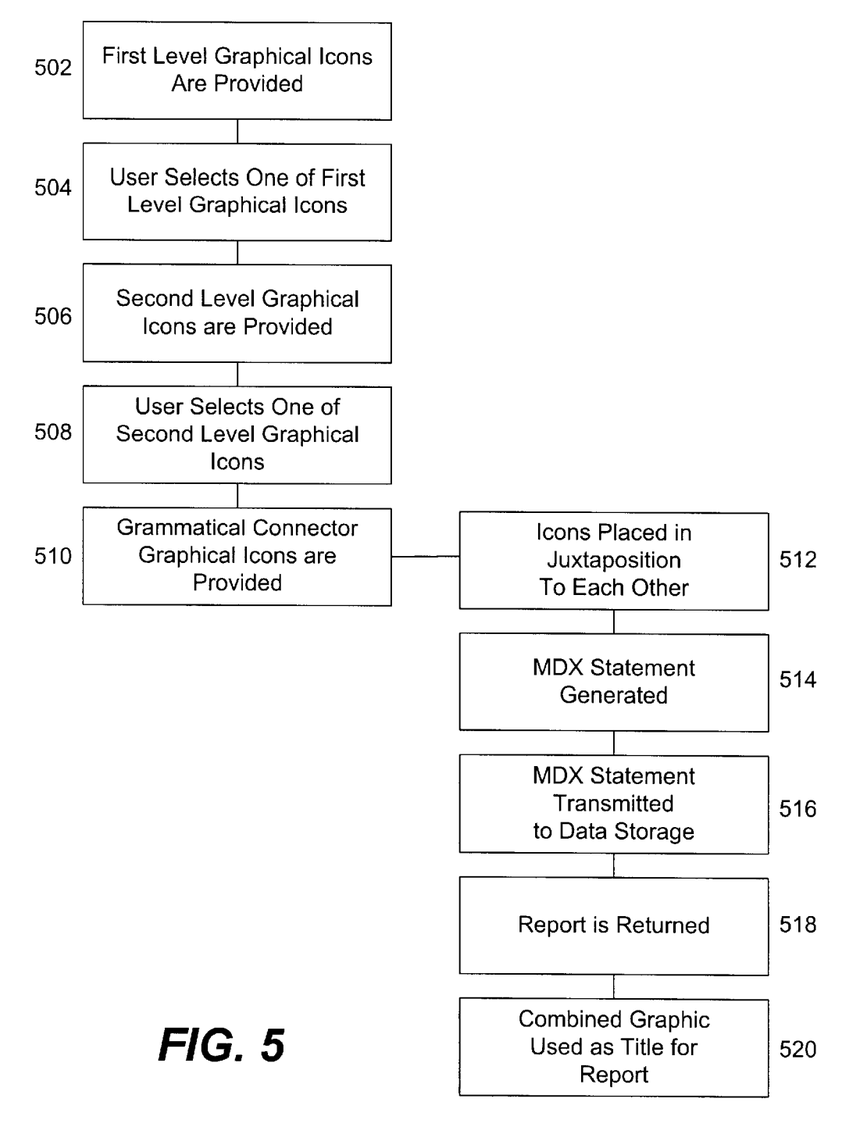
FIG. 5 is a flowchart detailing the basic operation of the present invention.

FIG. 5 is a flowchart detailing the basic operation of the present invention. As mentioned above, first, a number of first level graphical icons representing a first set of parameters, or measures, are provided 502 to the user. The user then selects 504 one of these first level graphical icons depending on the desired parameter. Based on this selection, a number of second level graphical icons representing a second set of parameters, or dimensions, which narrows the first parameter is provided 506. The user then selects 508 one of these second level graphical icons. Graphical icons representing grammatical connectors are also provided 510. The first level graphical icons, the graphical icons representing grammatical connectors, and the second level graphical icons are placed in juxtaposition 512 to each other to create a combined graphic representing the natural language statement. An MDX statement corresponding to these selections is generated 514 and sent 516 to the data storage mechanism. A report is returned 518 from the data storage mechanism based on the MDX statement. The combined graphic is then used 520 as the title for this report. Any number of levels of graphical icons representing any number of sets of parameters may be implemented into the present invention.

Figure 6:
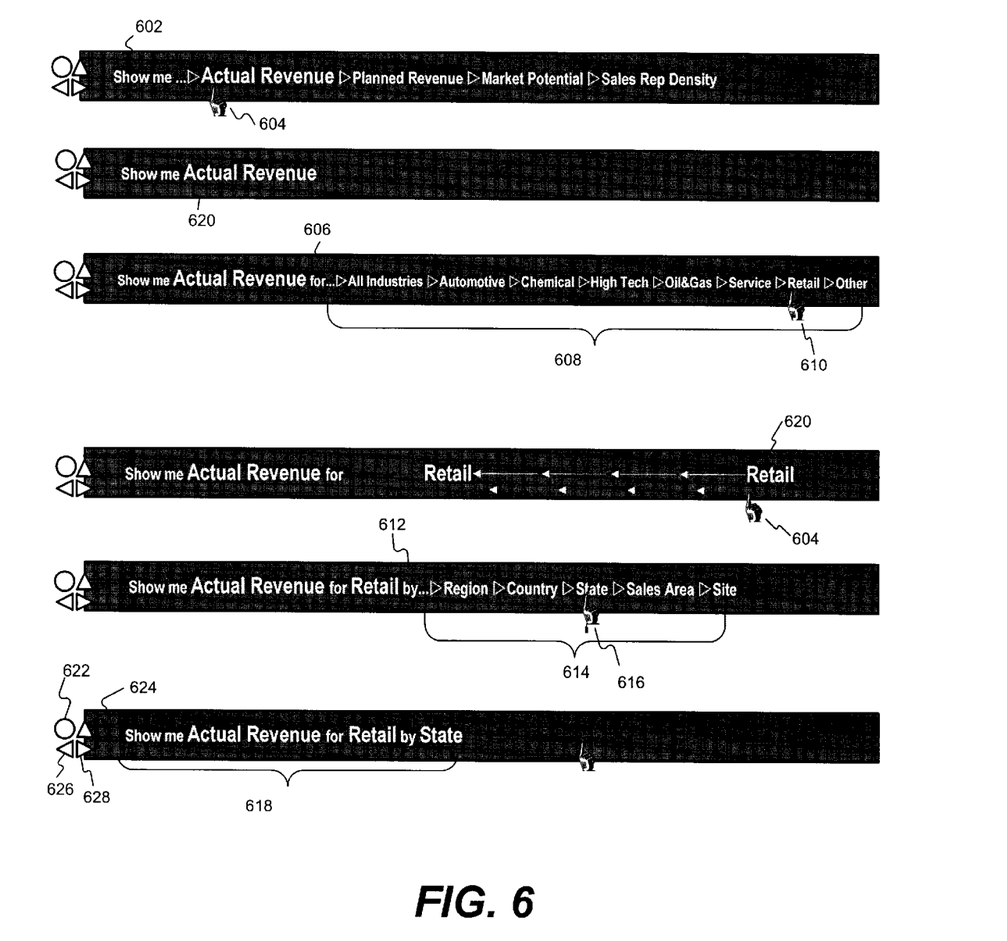
FIG. 6 depicts in detail the creation of the combined graphic representing the natural language statement and the animation aspects of the present invention.

FIG. 6 depicts in detail the creation of the combined graphic representing the natural language statement for the current example.

Figure 8:
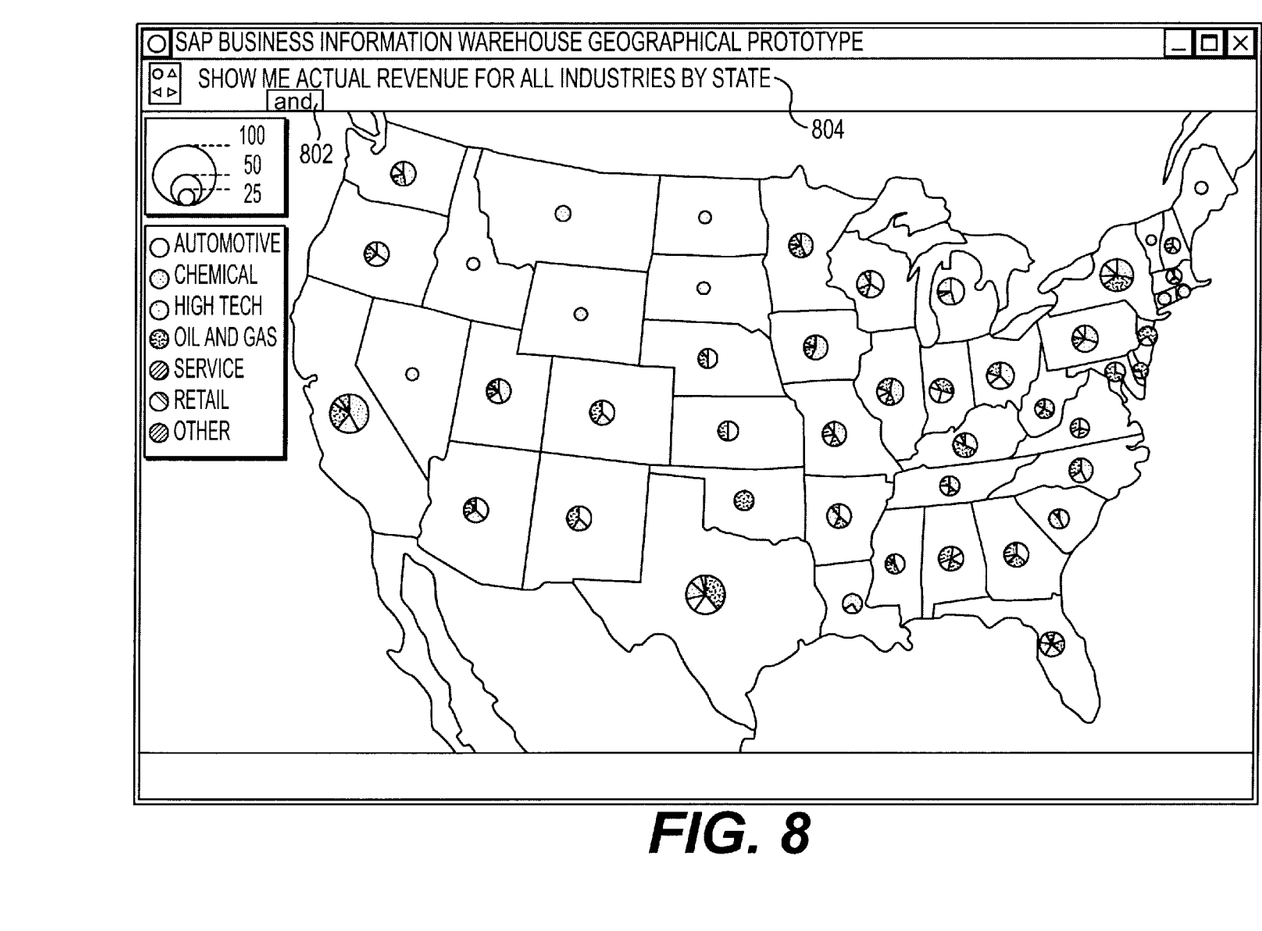
FIG. 8 depicts the results of an interface with another system for the representation of data results.

First, the initial action of the query, "Show Me," is displayed 602. Then, the user selects the parameter of interest by placing 604 the mouse pointer device over the graphical icon which corresponds to that parameter. Upon selection of this parameter, in this example, "Actual Revenue", a second graphical icon depicting the grammatical connector "for")is displayed 606 juxtapose to the "Actual Revenue")graphical icon in order to provide the flow of a grammatically correct natural language text. Then, the next level of parameters which are available for the parameter initially selected, is displayed 608. The user then selects 610 the parameter of interest by placing the mouse pointer device over the graphical icon which corresponds to that parameter. In this way, the user achieves a greater level of specificity for the query. Upon selection of this parameter, in this example, "Retail,")a graphical icon depicting the grammatical connector "by")is displayed 612 juxtapose to the "Retail")graphical icon. Then, the final level of parameters which are available for the "Retail")parameter is displayed 614. Upon selection 616 of the graphical icon corresponding to the final parameter, in this case, "State,")all the graphical icons have been placed juxtapose to each other to create a combined graphic representing a complete natural language statement 618. This combined graphic also serves as the title 804 for the report as shown in FIG. 8.

FIG. 6 also depicts the animation aspects of the present invention. When the mouse is placed 604 over the object which the user desires to view, the icon is animated 620 to a larger size and aligned with the rest of the query, and highlighted in a different color. Finally, the objects which belong to that object appear 608, and the process is repeated until the specificity has been reached. The interface also contains navigation buttons to move through the search. The globe icon 622 returns to the initial starting point of the search. The up arrow 624 moves up a level in the geographic drilldown. The left 626 and right 628 arrows go back and forth through the visualization history.

Figure 7:
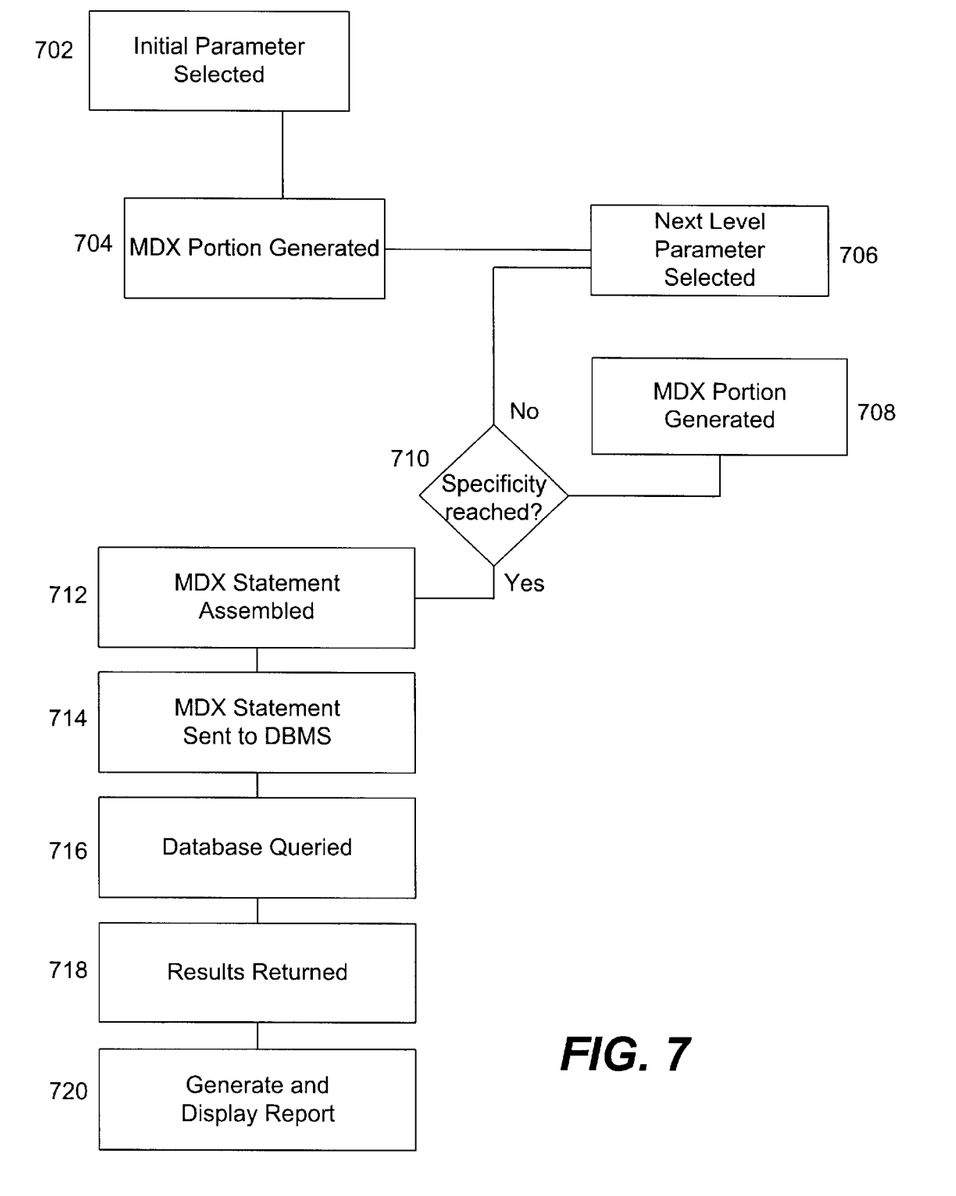
FIG. 7 is a flowchart detailing the sequential creation of the SQL statements with an unlimited number of parameter levels.

FIG. 7 is a flowchart detailing the sequential creation of the SQL statements with an unlimited number of parameter levels. First, selection 702 of the graphical icon representing the parameter through the title bar navigator whose value the user wishes to view, for example the value of the actual sales is selected. The system then generates 704 the portion of the MDX statement which has been assigned to the Actual Sales object. Second, the parameter is further narrowed by the user's selection 706 of an item in the subsequent menu selection, such as the selection of the graphical icon representing the retail sector parameter. The system then generates 708 the portion of the MDX statement which has been assigned to the RetailSector object. Then the parameter can be further narrowed at the user's choice 710 by the user's selection of an item in the subsequent menu selection, such as the selection of the graphical icon representing the "by state")parameter. The system then generates 708 the portion of the MDX statement which has been assigned to the ByState object. There is no particular limit to the level of specificity to which the query can be formulated. When the user has completed the drill down to the level of particularity he desires, the SQL portions are assembled into the completed SQL statement, which is then communicated 714 to the database management system, which then queries 716 the database and retrieves 718 the data from the data storage mechanism and returns it to the user. A report is then generated and visually displayed 720.

In order to have conversion from text-based MDX queries and pictorially depicted graphical queries, a common data structure is used. In the preferred embodiment, these structures are multiple relatable lists as per the use of ANSI standard SQL language. The MDX statements are reduced to SQL statements and certain elements of the SQL language are assigned to the various selectable data objects from the menu-driven system. The structure of the SQL language is composed of eight elements. In the current embodiment, the query establishes the following set of eight basic data structures. FromTable contains an ordered list of tables from which the data is to be queried. SelectColumn contains an ordered list of the column names which are included in the Select clause. SelectExp includes an ordered list of expressions and column functions that are included in the Select clause. WhereCond holds the boolean expression in the Where clause. GroupBy comprises an ordered list of column names which are in the Group By clause. HavingCond stores the boolean expression in the Having clause. OrderBy keeps the ordered list where OrderOp defines either an ascending or descending order of listing. DistinctFlag tracks the state of the Distinct key word. The graphical drilldown selection detailed above generates an SQL statement from the previous structures. The "Show Me Actual Revenue for Retail by State")constructs an SQL statement that calls the Actual Revenue table and selects the Retail column and the State row and sends this result back to the user interface.

The system can also interface with other systems for representation of data as in FIG. 8. In the simple embodiment, the data is returned in a table. In a preferred embodiment, the system is interfaced with a display system for the visual representation of the data in an interactive split pie chart. This system is referenced in patent application Ser. No. 09/186,672 filed Nov. 4, 1998 entitled "System and Method for the Visual Display of Data in an Interactive Split Pie Chart.")In order to accomplish this, the generated SQL statement from the graphical query is communicated to the display system which then relays the query to the database management system. When the data is returned to the system, it generates the interactive split pie chart as an alternate way of viewing the data results.

In another embodiment, multiple parameters can be selected simultaneously at any level of the drilldown search to generate multiple reports as shown in FIG. 8. The icon 802 represents the conjunction "and")and is used to create these compound queries.

Figure 9:
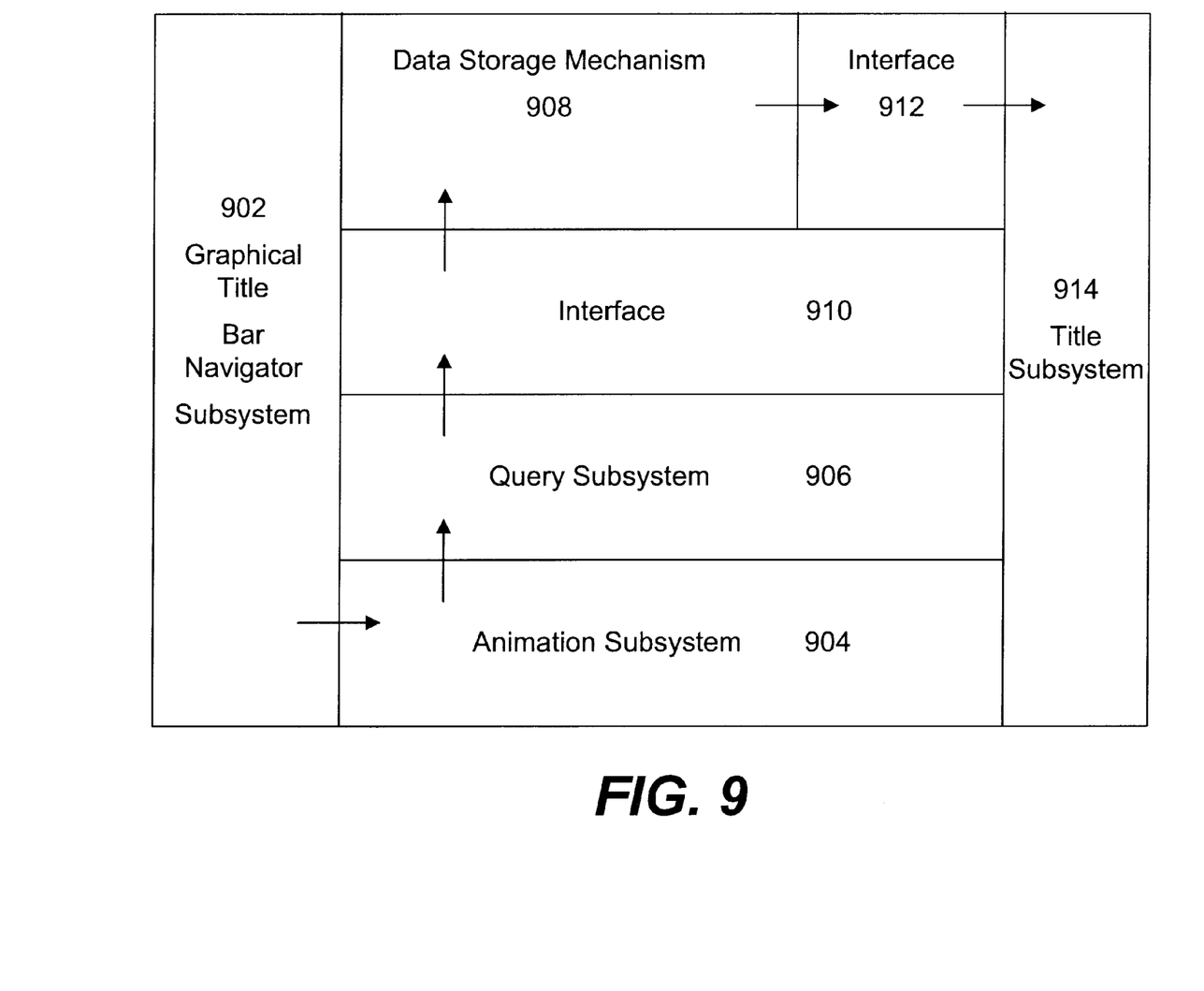
FIG. 9 depicts a hardware implementation of the present invention.

FIG. 9 depicts a hardware implementation of the present invention. Graphical title bar navigator subsystem 902 is used to select the appropriate parameters to define the query and create the title. Animation subsystem 904 provides a graphically dynamic environment to facilitate user interaction with graphical title bar navigator subsystem 902. Query subsystem 906 translates the natural language statement into an SQL query which is communicated to data storage mechanism 908 through interface 910. Based on this query, a report is returned through interface 912 where it is titled by title subsystem 914.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A system for creating and titling a report from a database storage mechanism comprising:

means for providing a plurality of graphical icon first level objects depicting natural language text representing a first plurality of parameters;

means for selecting at least two of said plurality of graphical icon first level objects to define at least two natural language statements;

means for providing a plurality of graphical icon second level objects depicting natural language text representing a plurality of parameters which narrows at least one of said natural language statements;

means for selecting at least one of said plurality of graphical icon second level objects;

means for providing a plurality of graphical icon objects depicting natural language text representing a plurality of grammatical connectors;

means for placing said graphical icon objects depicting natural language text, said at least two graphical icon first level objects, and said at least one graphical icon second level object in juxtaposition to each other to create a combined graphic representing said natural language statements;

means for generating a MDX query based on said graphical icon objects depicting natural language text, said at least two graphical icon first level objects, and said at least one graphical icon second level object;

means for communicating said MDX query to the database storage mechanism;

means for returning a report for said MDX query; and means for using the combined graphic representing said natural language statements as a title for said report.

2. The system of claim wherein 1 there is a plurality of levels of graphical icon objects depicting natural language text representing a plurality of levels of parameters which narrow said natural language statement.

3. The system of claim 1 further comprising a means for animating at least one of said plurality of graphical icon first level objects and one of said plurality of graphical icon second level objects upon selecting said graphical icon objects.

4. The system of claim 1 wherein said means for communicating said query to said database storage mechanism comprises a means for communicating said query to an independent query and display interface.

5. The system of claim 1 further comprising:

means for providing a plurality of graphical icon objects representing a plurality of mathematical operators;

means for selecting one of said plurality of graphical icon objects representing a plurality of mathematical operators; and means for linking said graphical icon first level objects to said at least one graphical icon second level objects with said one selected graphical icon object representing a mathematical operator.

6. The system of claim 1 wherein said database storage mechanism is a relational database.

7. The system of claim 1 wherein said database storage mechanism is a multidimensional database.

8. A system for creating and titling a report from a database storage mechanism comprising means for providing a plurality of graphical icon first level objects depicting natural language text representing a first plurality of parameters;

means for selecting one of said plurality of graphical icon first level objects to define a natural language statement;

means for providing a plurality of graphical icon second level objects depicting natural language text representing a plurality of parameters which narrows said natural language statement;

means for selecting at least two of said plurality of graphical icon second level objects to define at least two natural language statements;

means for providing a plurality of graphical icon objects depicting natural language text representing a plurality of grammatical connectors;

means for placing said graphical icon objects depicting natural language text, said graphical icon first level object, and said at least two graphical icon second level objects in juxtaposition to each other to create a combined graphic representing said natural language statements;

means for generating a MDX query based on said graphical icon objects depicting natural language text, said graphical icon first level object, and said at least two graphical icon second level objects;

means for communicating said MDX query to the database storage mechanism;

means for returning a report for said MDX query; and means for using the combined graphic representing said natural language statements as a title for said report.

9. A method for creating and titling a report from a database storage mechanism comprising:

providing a plurality of graphical icon first level objects depicting natural language text representing a first plurality of parameters;

selecting at least two of said plurality of graphical icon first level objects to define at least two natural language statements;

providing a plurality of graphical icon second level objects depicting natural language text representing a plurality of parameters which narrows at least one of said natural language statements;

selecting at least one of said plurality of graphical icon second level objects;

providing a plurality of graphical icon objects depicting natural language text representing a plurality of grammatical connectors;

placing said graphical icon objects depicting natural language text, said at least two graphical icon first level objects, and said at least one graphical icon second level object in juxtaposition to each other to create a combined graphic representing said natural language statements;

generating a MDX query based on said graphical icon objects depicting natural language text, said at least two graphical icon first level objects, and said at least one graphical icon second level object;

communicating said MDX query to the database storage mechanism;

returning a report for said MDX query; and using the combined graphic representing said natural language statements as a title for said report.

10. The method of claim 9 further comprising the step of providing a plurality of levels of graphical icon objects depicting natural language text representing a plurality of levels of parameters which narrow said natural language statement.

11. The method of claim 9 further comprising the step of animating at least one of said plurality of graphical icon first level objects and one of said plurality of graphical icon second level objects upon selecting said graphical icon objects.

12. The method of claim 9 wherein said communicating said query to said database storage mechanism further comprises the step of communicating said query to an independent query and display interface.

13. The method of claim 9 further comprising the steps of:

providing a plurality of graphical icon objects representing a plurality of mathematical operators;

selecting one of said plurality of graphical icon objects representing a plurality of mathematical operators; and linking said graphical icon first level objects to said at least one graphical icon second level objects with said one selected graphical icon object representing a mathematical operator.

14. The method of claim 9 wherein said database storage mechanism is a relational database.

15. The method of claim 9 wherein said database storage mechanism is a multidimensional database.

16. A method for creating and titling a report from a database storage mechanism comprising:

providing a plurality of graphical icon first level objects depicting natural language text representing a first plurality of parameters;

selecting one of said plurality of graphical icon first level objects to define a natural language statement;

providing a plurality of graphical icon second level objects depicting natural language text representing a plurality of parameters which narrows said natural language statement;

selecting at least two of said plurality of graphical icon second level objects to define at least two natural language statements;

providing a plurality of graphical icon objects depicting natural language text representing a plurality of grammatical connectors;

placing said graphical icon objects depicting natural language text, said graphical icon first level object, and said at least two graphical icon second level objects in juxtaposition to each other to create a combined graphic representing said natural language statements;

generating a MDX query based on said graphical icon objects depicting natural language text, said graphical icon first level object, and said at least two graphical icon second level objects;

communicating said MDX query to the database storage mechanism;

returning a report for said MDX query; and using the combined graphic representing said natural language statements as a title for said report.

17. A computer-readable medium having stored thereupon a plurality of instructions, said plurality of instructions including instructions which, when executed by a processor, cause the processor to perform the steps of:

providing a plurality of graphical icon first level objects depicting natural language text representing a first plurality of parameters;

selecting at least two of said plurality of graphical icon first level objects to define at least two natural language statements;

providing a plurality of graphical icon second level objects depicting natural language text representing a plurality of parameters which narrows at least one of said natural language statements;

selecting at least one of said plurality of graphical icon second level objects;

providing a plurality of graphical icon objects depicting natural language text representing a plurality of grammatical connectors;

placing said graphical icon objects depicting natural language text, said at least two graphical icon first level objects, and said at least one graphical icon second level object in juxtaposition to each other to create a combined graphic representing said natural language statements;

generating a MDX query based on said graphical icon objects depicting natural language text, said at least two graphical icon first level objects, and said at least one graphical icon second level object;

communicating said MDX query to the database storage mechanism;

returning a report for said MDX query; and using the combined graphic representing said natural language statements as a title for said report.

18. The computer-readable medium of claim 17 wherein said instructions, when executed by said processor, cause said processor to perform the further step of providing a plurality of levels of graphical icon objects depicting natural language text representing a plurality of levels of parameters which narrow said natural language statement.

19. The computer-readable medium of claim 17 wherein said instructions, when executed by said processor, cause said processor to perform the further step of animating at least one of said plurality of graphical icon first level objects and one of said plurality of graphical icon second level objects upon selecting said graphical icon objects.

20. The computer-readable medium of claim 17 wherein said instructions when executed by said processor, cause said processor to perform the further step of communicating said query to an independent query and display interface.

21. The computer-readable medium of claim 17 wherein said instructions, when executed by said processor, cause said processor to perform the further step of:

providing a plurality of graphical icon objects representing a plurality of mathematical operators;

selecting one of said plurality of graphical icon objects representing a plurality of mathematical operators; and linking said graphical icon first level objects to said at least one graphical icon second level objects with said one selected graphical icon object representing a mathematical operator.

22. The computer-readable medium of claim 17 wherein said database storage mechanism is a relational database.

23. The computer-readable medium of claim 17 wherein said database storage mechanism is a multidimensional database.

24. A computer-readable medium having stored thereupon a plurality of instructions, said plurality of instructions including instructions which, when executed by a processor, cause the processor to perform the steps of:

providing a plurality of graphical icon first level objects depicting natural language text representing a first plurality of parameters;

selecting one of said plurality of graphical icon first level objects to define a natural language statement;

providing a plurality of graphical icon second level objects depicting natural language text representing a plurality of parameters which narrows said natural language statement;

selecting at least two of said plurality of graphical icon second level objects to define at least two natural language statements;

providing a plurality of graphical icon objects depicting natural language text representing a plurality of grammatical connectors;

placing said graphical icon objects depicting natural language text, said graphical icon first level object, and said at least two graphical icon second level objects in juxtaposition to each other to create a combined graphic representing said natural language statements;

generating a MDX query based on said graphical icon objects depicting natural language text, said graphical icon first level object, and said at least two graphical icon second level objects;

communicating said MDX query to the database storage mechanism;

returning a report for said MDX query; and using the combined graphic representing said natural language statements as a title for said report.

\* \* \* \* \*